United States Patent
Powell

[11] Patent Number: 5,379,793
[45] Date of Patent: Jan. 10, 1995

[54] VENTLESS TRANSFER VALVE AND METHOD FOR USING SAME

[76] Inventor: Johnathan S. Powell, 5094 Tip Top Rd., Mariposa, Calif. 95338

[21] Appl. No.: 116,582
[22] Filed: Sep. 7, 1993
[51] Int. Cl.⁶ ............................................. F16L 37/28
[52] U.S. Cl. ...................... 137/15; 137/614; 137/614.01
[58] Field of Search ............ 137/614, 614.01, 1, 137/15

[56] References Cited

U.S. PATENT DOCUMENTS

| | | | |
|---|---|---|---|
| 1,000,945 | 8/1911 | Ray | 137/614 |
| 1,082,512 | 12/1913 | Gainer | 137/614 |
| 2,372,820 | 5/1945 | Gardes | 137/614 |
| 2,502,630 | 7/1946 | Morrison | 137/614 |
| 2,934,915 | 3/1960 | Morse | 137/614 |
| 5,042,840 | 8/1991 | Rieple et al. | 137/614 |

FOREIGN PATENT DOCUMENTS 336273 12/1936 Italy ................................. 137/614

Primary Examiner—A. Michael Chambers
Attorney, Agent, or Firm—Lewis E. Massie

[57] ABSTRACT

This invention describes a ventless transfer valve and the method of use to transfer of liquid chlorine from a supply cylinder mounted in a wheeled vehicle or at a yard location to smaller easily transportable cylinders without the discharge of a significant amount of chlorine into the atmosphere when filling and removing the small cylinder from the supply cylinder.

4 Claims, 2 Drawing Sheets

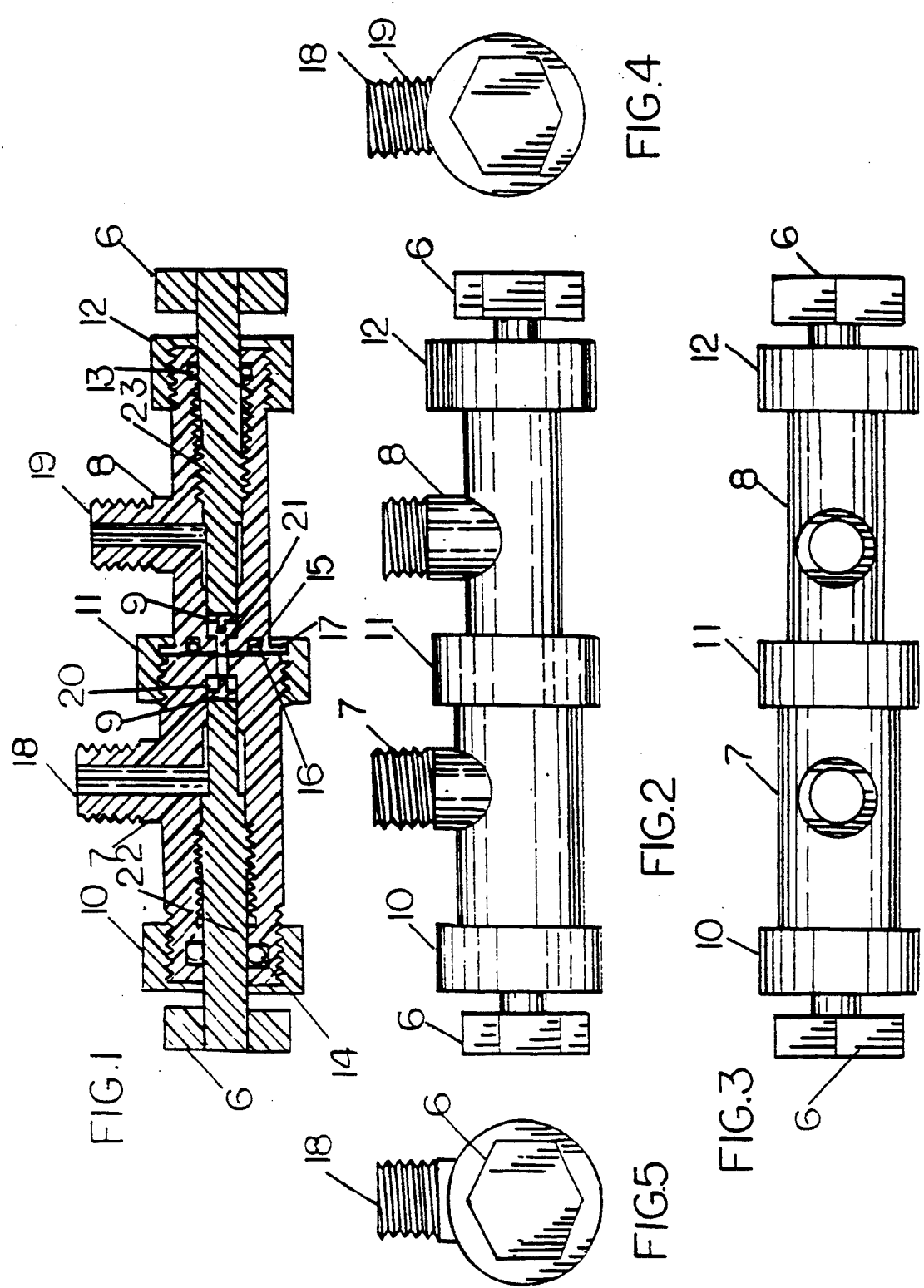

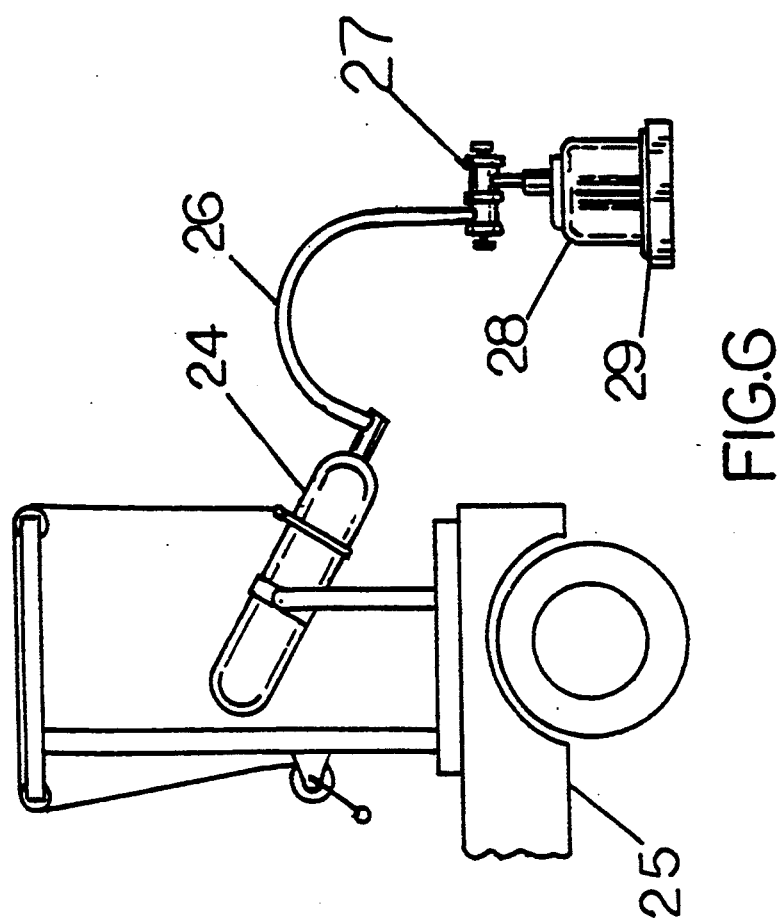

5,379,793

VENTLESS TRANSFER VALVE AND METHOD FOR USING SAME

BACKGROUND OF THE INVENTION

1. Field of the Invention

Conventional methods of dispensing chlorine into swimming pools is accomplished by transporting a small cylinder of liquid chlorine, and chlorine gas is dispensed from the cylinder into the pool water. The small cylinder is filled by transferring liquid chlorine from a larger supply cylinder. This is accomplished by cooling the small cylinder in a freezer chest and connecting the small cylinder to the supply cylinder through a transfer valve manifold. Due to the lower vapor pressure of the chlorine in the small cylinder, liquid chlorine flows from the supply cylinder to the small cylinder. When the small cylinder is full, the valves on the small cylinder, the supply cylinder, and the transfer valve manifold are closed trapping some liquid chlorine in the passage ways of the transfer valve manifold and the connector tube to the small cylinder. To prevent this chlorine from being discharged into the atmosphere when the small cylinder is disconnected, a bleed valve is opened on the transfer valve manifold and this chlorine is discharged into a caustic scrubber solution.

This method requires the preparation and disposal of spent caustic solution. A caustic storage tank, a barometric loop, and a pump to circulate the caustic solution through a venturi to suck the chlorine from the transfer valve manifold.

2. Description of the Related Art

The prior art describes many valve arrangements for transferring of liquified gases from one container to another without the escape of any significant amount of the gases being transferred. A pertinent reference is U.S. Pat. No. 1,000,945 issued to William Ray in August 1911, describing an arrangement of two valves connected as a twin valve coupling "whereby when the valves are closed the intervening space becomes nil" U.S. Pat. No. 8,2,372,820 issued to Gardes in April 1945, describes a conduit connection for a fluid pressure control adapted to provide quickly detachable connections in conduits leading from one of a fluid pressure control mechanism to another. U.S. Pat. No. 2,502,630 issued to Morrison in July 1946, describes a disconnectable coupling having a manually closable valve in each section.

SUMMARY OF THE INVENTION

It is a primary objective of this invention to provide an improved a ventless transfer valve and to describe a method for using this valve in the transfer of liquid chlorine from a supply cylinder to a smaller transportable cylinder without the discharge of any significant amount of chlorine to the atmosphere when the small cylinder is disconnected .from the supply cylinder. This is accomplished by using a transfer valve of two valves removably coupled together with their valve ports axially aligned at the interface between the two valves. The valve ports in the closed position are plugged by the end of the valve stems to the interface so that there is no free space to trap chlorine. After the small cylinder is filled and the two valves are closed, the valves can be uncoupled and no significant chlorine is released to the atmosphere.

This transfer process provides a practical method of transferring chlorine in small cylinders from a larger supply cylinder mounted in a vehicle, proximate the swimming pool, to the swimming pool. When the chlorine gas is dispersed into the swimming pool water the liquid chlorine in the small cylinder is cooled by evaporation. More chlorine can then be transferred from the supply cylinder to the small cylinder because of the difference of the vapor pressure of the chlorine in the supply cylinder and the small cylinder.

The process can also be used to transfer liquid chlorine from a stationary supply cylinder in a yard location to a portable small cylinder without the release of chlorine after cooling the portable cylinder in a freezer chest.

BRIEF DESCRIPTION OF THE DRAWINGS

FIG. 1 is a partially sectioned side view of the ventless transfer valve assembly;

FIG. 2 is a side view of the ventless transfer valve assembly;

FIG. 3 is a top plan view of the ventless transfer valve assembly;

FIG. 4 is a right end view of the ventless transfer valve assembly;

FIG. 5 is a left end view of the ventless transfer valve assembly.

FIG. 6 a view of the wheeled vehicle with supply cylinder, transfer valve, weighing scale and small cylinder.

DETAILED DESCRIPTION OF THE PREFERRED EMBODIMENTS

In FIG. 1 a first and second valve, 7 and 8, are shown coupled longitudinally at their flat interfaces 16 by the threaded coupling ring 11 which is retained by the shoulder ring 17 on the second valve 8. A Viton or Teflon "O" ring 15, is retained by a circular groove in the interface surface of the second valve. When each valve is closed the ends 20 of the valve stems 22 and 23, plugs the ports 21 and seals against their seats thus eliminating the free space between valves. The threaded valve stem 22 of the first valve is actuated by the handle 6, and is retained by the coupling ring 10 and sealed by the Viton or Teflon "O" ring 14. The interface ends of the valve stems 9 are made from Teflon seating on KYNAR ports 20. Valve 2 is shown with the valve stem 23, the "O" ring 13, the coupling ring 12 and the handle 6. Threaded ports 18 and 19 are shown on valves 7 and 8.

In the method of use a 150 pound cylinder of chlorine 24 is mounted on a tiltable cradle attached to a wheeled vehicle 25. The cradle capable of elevating said cylinder to place the liquid chlorine therein at the bottom of the cylinder at the valve end. A small cylinder 28 is placed upon a weighing scale 29 and the weight determined, valve port 18 of the first valve is connected to the output valve of the supply cylinder by means of the conduit 26, the valve being closed. The valve port 19 of the second valve is connected to the inlet port of the small cylinder, the valve being closed. Both valves are now opened and a predetermined weight of chlorine allowed to enter the small cylinder. Both valves are then closed and the small cylinder is detached from the filling apparatus and transported to the swimming pool where the chlorine is dispersed into the swimming pool water.

I claim:

1. Method for transferring liquid chlorine from a supply cylinder to a small cylinder using a ventless transfer valve wherein the improvements comprise:
   (a), mounting a supply cylinder of chlorine on a rotatable cradle on a wheeled vehicle;
   (b), mounting a weighing scale having a support means for a small chlorine cylinder near said vehicle;
   (c), placing a small chlorine cylinder on said weighing scale;
   (d), connecting a ventless transfer valve to the input of said cylinder;
   (e), connecting the supply cylinder to said transfer valve;
   (f), opening both valves-to admit a predetermined weight of chlorine into the small cylinder; and,
   (g), closing both valves before disconnecting and removing the small cylinder.

2. A ventless transfer valve made of two separate valve housings removably coupled together with their valve stems in axial alignment wherein the improvements comprise:
   (a), each valve having a threaded valve stem engaging internal threads in the valve housing;
   (b), one end of the valve stems having a handle thereon;
   (c), the other end having a valve plunger tip;
   (d), that portion of the valve stem adjacent to the plunger tip being of reduced diameter;
   (e), the valve stem bore of the first valve terminating in a flat surface having a centrally located orifice therethrough;
   (f), the valve stem bore of the second valve terminating in a flat surface having a centrally located orifice therethrough;
   (g), each valve housing having an externally threaded pipe extending laterally from that section of the bore where the valve stem is of reduced diameter;
   (h), the outside end portion of each valve housing threaded to accommodate a valve stem retaining ring; and,
   (i), retaining rings in the valve stem bore of the valve housings to accommodate sealing "O" rings.

3. A ventless transfer valve made of two separate valve housings removably coupled together with their valve stems in axial alignment wherein the improvements comprise:
   (a), each valve having a threaded valve stem engaging internal threads in the valve housing,
   (b), one end of the valve stems having a handle thereon;
   (c), the other end having a valve plunger tip;
   (d), that portion of the valve stem adjacent to the plunger tip being of reduced diameter;
   (e), the valve stem bore of the first valve terminating in a flat surface having a centrally located orifice there through;
   (f), the valve stem bore of the second valve terminating in a flat surface having a centrally located orifice therethrough;
   (g), each valve housing having an externally threaded pipe extending laterally from that section of the bore where the valve stem is of reduced diameter;
   (h), the outside and portion of each valve housing threaded to accommodate a valve stem retaining ring; and,
   (i), retaining rings in the valve stem bore of the valve housings to accommodate sealing "O" rings.

4. The ventless transfer valve and method for using same of claim 3 further comprising:
   (a), a 150 pound supply cylinder of chlorine;
   (b), a tiltable cradle, elevated and tiltable so that the liquid chlorine is at the bottom or the valve end of the cylinder;
   (c), a wheeled vehicle for transporting said cradle with said supply cylinder;
   (d), a small cylinder for transporting chlorine; and
   (e), a weighing scale for weighing said small cylinder.

* * * * *